United States Patent
Boyer et al.

(10) Patent No.: US 7,130,140 B1
(45) Date of Patent: Oct. 31, 2006

(54) POLARITY ENCODED PATTERN FOR TIMING BASED SERVO

(75) Inventors: Keith Gary Boyer, Broomfield, CO (US); James C. Cates, Superior, CO (US); James William Wolf, Loveland, CO (US)

(73) Assignee: Storage Technology Corporation, Louisville, CO (US)

( * ) Notice: Subject to any disclaimer, the term of this patent is extended or adjusted under 35 U.S.C. 154(b) by 543 days.

(21) Appl. No.: 10/139,769

(22) Filed: May 6, 2002

(51) Int. Cl.
*G11B 5/09* (2006.01)

(52) U.S. Cl. .................................... 360/48

(58) Field of Classification Search ............... 360/48, 360/51, 31, 75, 53
See application file for complete search history.

(56) References Cited

U.S. PATENT DOCUMENTS

| | | | |
|---|---|---|---|
| 5,229,895 A | 7/1993 | Schwarz et al. | 360/77.12 |
| 5,262,908 A | 11/1993 | Iwamatsu et al. | 360/77.12 |
| 5,602,703 A | 2/1997 | Moore et al. | 360/121 |
| 6,078,463 A * | 6/2000 | Pahr | 360/48 |
| 6,134,070 A | 10/2000 | Tran et al. | 360/75 |
| 6,169,640 B1 | 1/2001 | Fasen | 360/48 |
| 6,462,904 B1 * | 10/2002 | Albrecht et al. | 360/122 |
| 6,542,325 B1 * | 4/2003 | Molstad et al. | 360/48 |

OTHER PUBLICATIONS

Barrett et al., "Timing-Based Track-Following Servo for Linear Tape Systems", IEEE Transactions on Magnetics, vol. 34, No. 4, Jul. 1998, pp. 1872-1877.

\* cited by examiner

*Primary Examiner*—Wayne Young
*Assistant Examiner*—Glenda P. Rodriguez
(74) *Attorney, Agent, or Firm*—Yee & Associates, P.C.

(57) ABSTRACT

Servo tracks for magnetic tape storage are written using two opposite polarities, rather than the one polarity normally used in servo tracks. Timing continues to be performed using only pattern members of like polarity, due to physical restraints, but the use of two polarities allows additional information to be encoded in the pattern more efficiently.

17 Claims, 6 Drawing Sheets

POLARITY ENCODED PATTERN FOR TIMING BASED SERVO

BACKGROUND OF THE INVENTION

1. Field of the Invention

This invention relates generally to recording and reading data from magnetic storage media and, more particularly, to servo control systems that maintain the position of a magnetic head relative to tracks in magnetic tapes.

2. Background of the Invention

As the magnetic storage of information becomes more sophisticated, greater amounts of data are packed into smaller volumes of space. In storing large amounts of data on a magnetic tape, multiple "tracks" of data are stored paralleling the length of the tape. The number of tracks that can be stored on a particular width of tape depends on the sensitivity of the technology used, but it is currently possible to have hundreds of tracks on a ½ inch wide magnetic tape.

A major hurdle in recording and reading data from these hundreds of tracks is the lateral movement of the tape media as it traverses the read/write head. This is overcome by manufacturing the tape with recorded tracks of servo information at various lateral locations across the tape. These servo tracks provide information that allow the servo mechanisms in a tape transport to correctly position the head with respect to the data tracks.

FIG. 1 shows a diagram of a tape and read/write head. Tape 100 has a number of servo tracks 101–105. Data is stored in bands 106–109 between servo tracks 101–105, with each data band containing a given number of tracks, depending on the technology. In these examples, read/write head 112 contains three servo read elements 114, 116, 118 and a number of data read/write elements that are not specifically shown; read/write head 112 can be positioned over an upper portion 124 or a lower portion 126 of tape 100. Read/write head 112 is made wider than the tape so that no matter what its position, the head 112 supports tape 100. Servo read elements 114, 116, 118 read the information from the servo tracks; from this, the servo mechanism can calculate any movements necessary to maintain the proper position of read/write head 112 with regard to tape 100.

The servo tracks, in addition to providing positioning information for the servo mechanisms, can be encoded to carry additional useful information, such as identifying the individual servo tracks and the current longitudinal position along the tape. As a tape stretches over its lifetime, the servo tracks can also be used to adjust for the distortion.

There are a number of different methods of coding information in the patterns written in the servo tracks. One very useful method is timing-based coding, as it provides a method of position sensing that is insensitive to reading speed. This method is discussed in U.S. Pat. No. 6,021,013, which is hereby incorporated by reference. In this patent, each servo track is written with a repeating cyclic sequence of two patterned lines whose separation from each other varies in a consistent manner across the width of the servo track, with periodic gaps in the pattern to serve as a starting point for the pattern. Two exemplary patterns 200 and 300 from this patent are reproduced in FIG. 2 and FIG. 3. The time A between the detection of two dissimilar lines is compared to the time B between the detection of two similar lines. The value of A:B reveals how far off center the servo read head is at the time of reading, and thus the amount of correction necessary to properly locate the read head. Using this ratio rather than distances allows for the fact that the tape can be moving at different speeds or may have stretched slightly. Thus, it is possible to maintain a position over a given band of data.

While the two patterns 200, 300 demonstrate the principles of timing-based servo patterns, it has been found that single comparisons of A and B are not enough for accurate measurements. Therefore, nested patterns, such as pattern 400 shown in FIG. 4, are more commonly used. Using a nested pattern of four chevrons, four measurements can be taken across a given length of tape; their averaged value of A:B is much more accurate. The detection of an expected sequence of stripes (generally, two sets of five followed by two sets of four) also provides an efficient means of error detection, as the software can immediately detect when an expected input is not found.

To provide the high accuracy necessary, the tape is recorded on a special servo-track machine. The first portion of the recording head contains an erase head, which erases the entire width of the tape, followed by a single-coil, multi-gap write element, capable of writing all servo tracks on a tape in one pass. Unlike normal data write elements, which are continuously powered and switch from one polarity to the opposite polarity repeatedly, the servo write element is switched on and off and normally writes in only one polarity. Additionally, the write element is patterned, so that a each time it is powered, it produces an image on the tape of the patterned write element. By controlling the switching of the write element as the tape moves across the head, the pattern is repetitively written on each of the servo tracks. For a nested pattern, images of both the left and right component of a pattern are written simultaneously to maintain the accuracy.

Creation of the pattern shown in FIG. 4 is demonstrated in FIGS. 4A–J. In this example, the figures show the same section of the tape as it moves from right to left across the write head. The portion of the tape that appears white has already been erased. FIG. 4J is a timing pattern that shows when the write element is pulsed, while FIGS. 4A–I show the tape sequentially after each pulse. Looking at FIG. 4A, the first pulse P1 of the write element has produced an image of the pattern that is on the write element, creating the two-chevron pattern 410-1. FIG. 4B shows the tape after pulse P2 has written pattern 410-2, FIG. 4C shows it after pulse P3 has written pattern 410-3, FIG. 4D shows it after pulse P4 has written pattern 410-4, FIG. 4E shows it after pulse P5 has written pattern 410-5. After the initial five pulses, the write element is not pulsed again until the initial five nested chevrons 410-1 through 410-5 have all passed the write element, then four further pulses P6–P9 write the pattern of four nested chevrons 410-6 through 410-7. The process will continue until all servo patterns are written along the entire length of a tape.

In order for the timing based servo patterns to work properly, several factors that can adversely affect the outcome must be taken into account. First, the servo read elements must be much narrower than the servo track, so that each servo read element detects only a narrow width of the pattern created. This serves to minimize tracking errors due to false position signals. Secondly, all of the pattern lines are written using a uni-polar write current and the timing is measured only between magnetic flux transitions having the same polarity (e.g., always timing the transition at the beginning of a line). Variations in the write head or the writing process, as well as other difficulties can cause apparent shifts in the timing of transitions having opposite polarities, so opposite transitions are never compared.

In order to position the read head 112 of FIG. 1 over the correct band of data 106, 107, 108, 109, different patterns are used for different servo tracks. For example, if pattern 200 is used on three servo tracks 101, 102, 105 of FIG. 1, and pattern 300 is used on servo tracks 103 and 104, then by reading two adjacent servo tracks and recognizing their patterns, it is possible to determine which data band is between the two servo tracks, using the following Table 1:

| Upper servo pattern | Lower servo pattern | Data band |
|---|---|---|
| 200 | 200 | 106 |
| 200 | 300 | 107 |
| 300 | 300 | 108 |
| 300 | 200 | 109 |

Within the servo tracks, additional information, such as the longitudinal location, can be encoded by varying specific portions of the pattern, such as the distance between successive groupings of the pattern. Because servo tracks are typically recorded at a much lower density than the data tracks, they can be read at high speeds. This ability to read longitudinal data at high speeds makes searches much more efficient.

While the beauty of a timing-based servo system lies in the fact that it utilizes comparisons rather than individual symbols, this very concept also confines it. Since meaning is only carried in comparative relationships, the density of information is necessarily low. It would be desirable to carry additional information in the timing pattern without destroying the timing pattern itself.

One solution that has been disclosed is U.S. Pat. No. 6,169,640. This patent discloses using, for example, four servo tracks on which the timing patterns are identical, but not synchronized with each other. Rather, as seen in FIG. 8 in U.S. Pat. No. 6,169,640, the two inner tracks 102 and 103 are offset a given amount from the two outer tracks 101 and 104. The result is that each adjacent pair of servo tracks exhibits a different timing relationship as compared to the other pairs of servo tracks, providing identification of the servo tracks by this offset. However, this scheme comes with its own drawback. Since the servo tracks are not synchronized with each other, the software must be concerned with phase differences between the servo tracks when creating a position error signal. It would be beneficial to identify the tracks without losing synchronicity.

SUMMARY OF THE INVENTION

Rather than using servo patterns that are of one polarity, the inventive method and apparatus writes servo patterns using two polarities to designate "0" and "1". If desired, a single servo pattern can be used for all the servo tracks, with additional information carried in the polarity of the pattern. This use of two polarities allows a simpler, more efficient means of storing additional information within the servo track.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
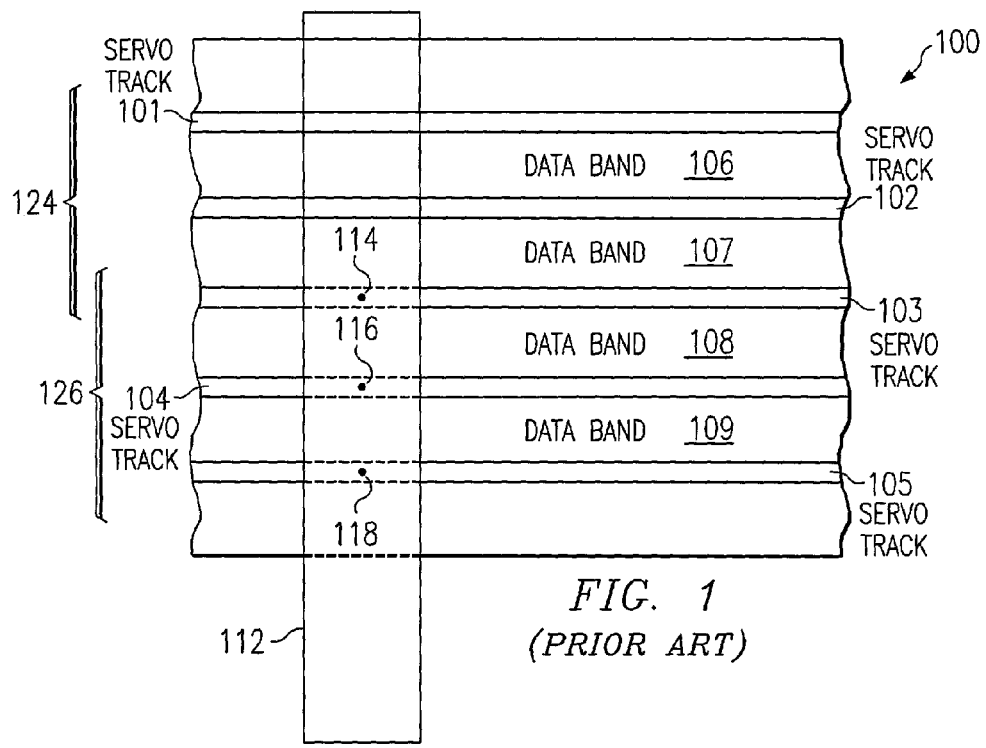
FIG. 1 shows a tape and a read/write head positioned to read the tape.
Figure 2:
FIG. 2 shows one pattern for a timing based servo track.
Figure 3:
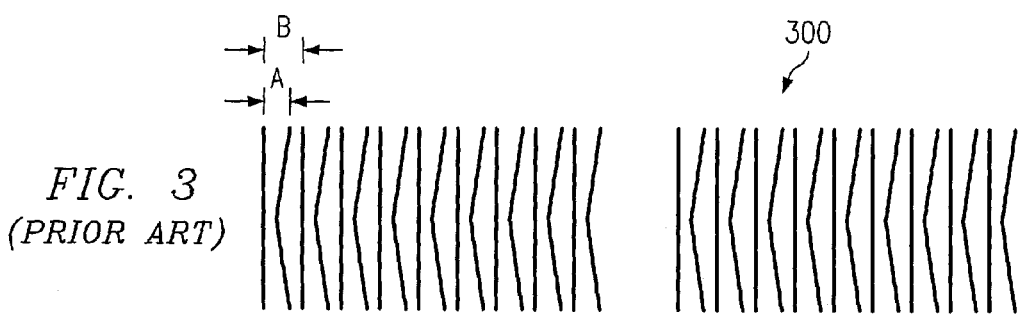
FIG. 3 shows an alternate pattern for a timing based servo track.
Figure 4:
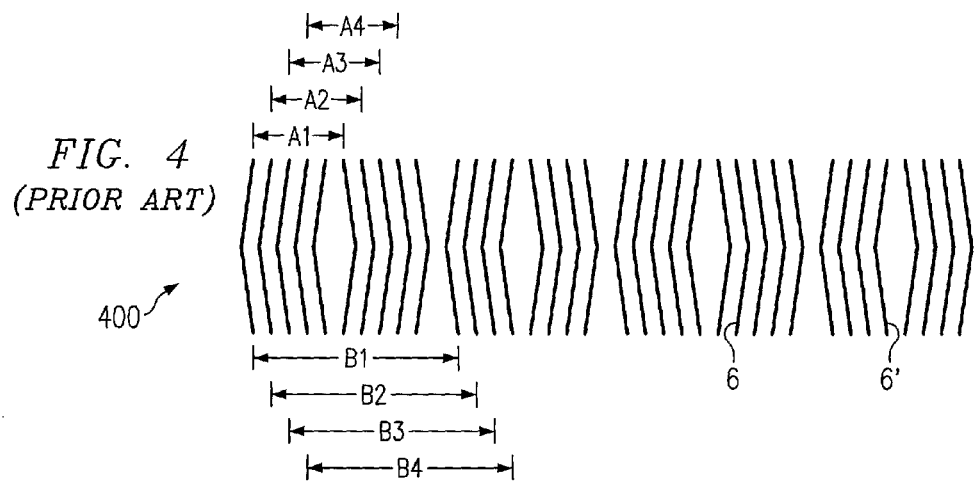
FIG. 4 shows an alternate nested pattern for a timing based servo track.
Figure 4A:
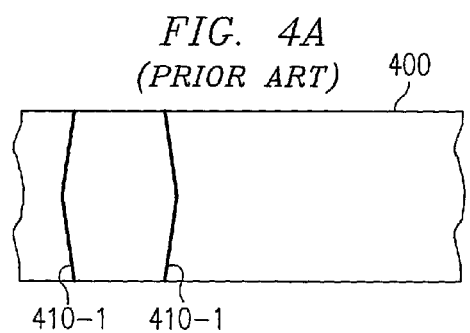
FIGS. 4A–I show the sequence as a nested pattern is created.
Figure 4B:
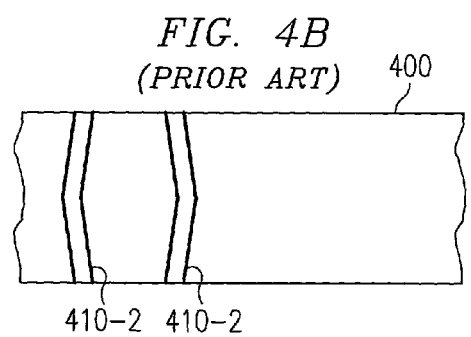
Figure 4C:
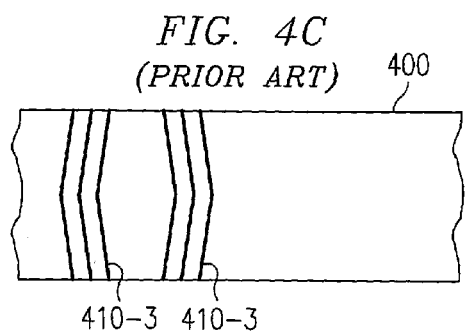
Figure 4D:
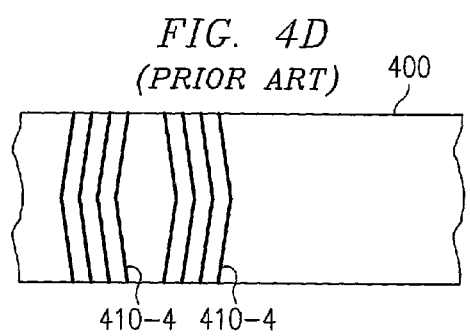
Figure 4E:
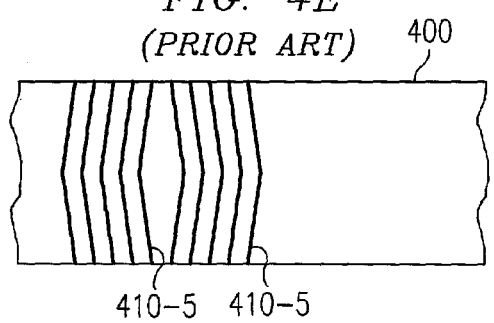
Figure 4F:
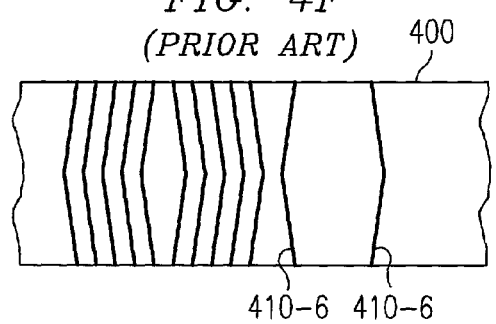
Figure 4G:
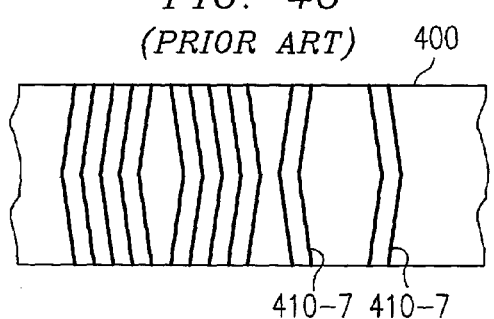
Figure 4H:
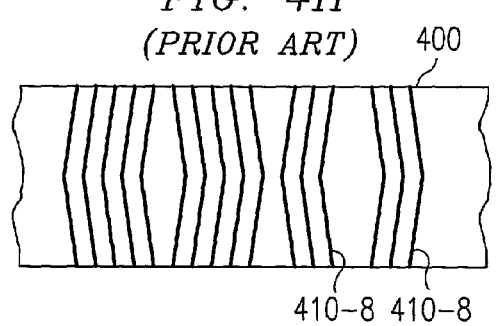
Figure 4I:
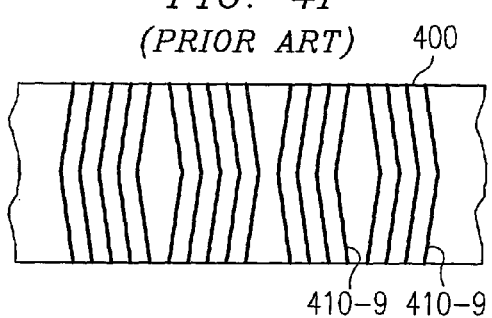
Figure 4J:
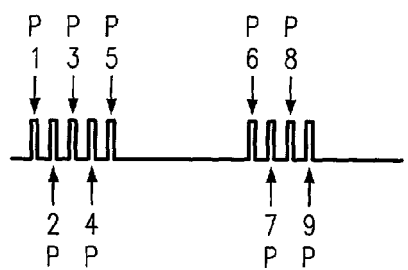
FIG. 4J shows the timing pattern for pulsing the write element to create this pattern.
Figure 5:
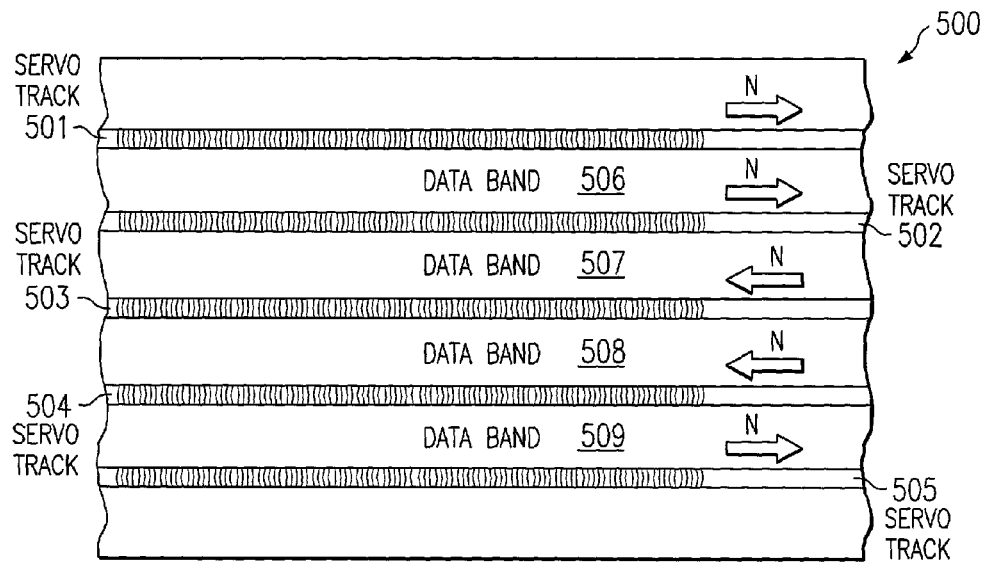
FIG. 5 shows a first embodiment of the innovative use of servo patterns having two polarities.

Referring now to FIG. 5, a first embodiment of the invention is shown. In this embodiment, all five servo tracks 501, 502, 503, 504, 505 on a tape 500 are written with the nested pattern 400, but unlike previous servo patterns, three servo tracks 501, 502, 505 are written with a first (+) polarity, while the other two servo tracks 503, 504, are written with an opposite (−) polarity. The data locations are determined according to the following Table 2:

| Upper servo polarity | Lower servo polarity | Data band |
|---|---|---|
| + | + | 506 |
| + | − | 507 |
| − | − | 508 |
| − | + | 509 |

Timing based servo patterns are currently written by a multi-gap, single coil write head, which limits all servo tracks to having the same polarity. In order to write servo patterns having different polarities, one can use a multi-track planar write head, such as is described in U.S. patent application Ser. No. 09/283,958 filed Apr. 1, 1999. The listed application is owned by the Assignee of this application and is hereby incorporated by reference.

Figure 6A:
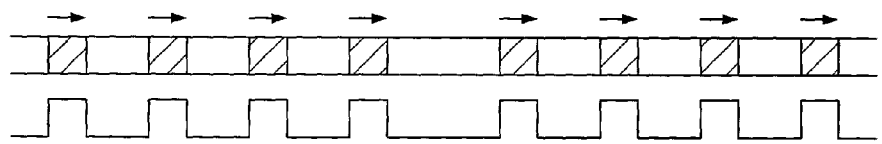
FIGS. 6A–C show examples of a signal created by a servo read head reading three patterns that are identical except for their polarities: the signal of FIG. 6A has a first polarity, the signal of FIG. 6B has the opposite polarity, and the signal of FIG. 6C contains both polarities.
Figure 6B:
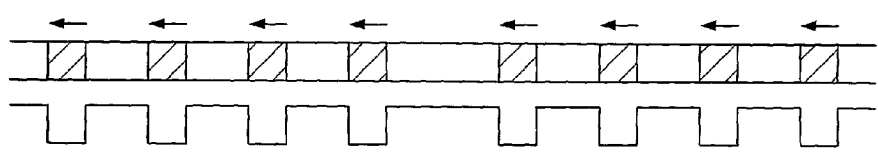

Referring now to FIG. 6A, dotted lines in the figure show the path of a servo read head 114 as it reads a section of pattern 400 taken at line 6–6'. The dark squares represent the magnetic lines of the servo pattern as they are read, with their polarity shown above each line. Below the read path is a signal that would be generated in response to reading the magnetic line. FIG. 6B shows an example of the same signal, written with the opposite polarity, and the signal generated from reading this servo pattern. In prior art tapes the same polarity, either the polarity of FIG. 6A or the polarity of FIG. 6B, would be used for each and every servo pattern on the tape. With the innovative system, one servo track could be written using the first polarity, while other tracks could have the second polarity.

In this example, the polarity of the servo line is only used to help identify the individual bands of data by their association with the different polarity servo tracks. The treatment of each servo line is exactly the same as in the prior art.

Figure 6C:
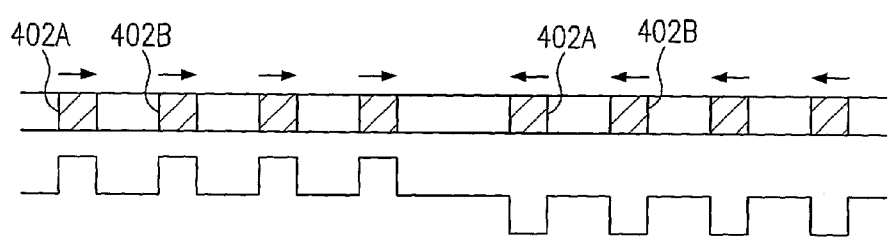
Figure 7:
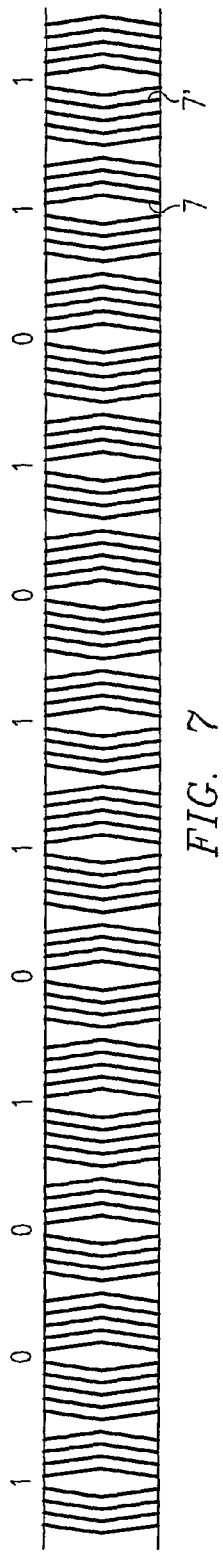
FIG. 7 shows a second embodiment of the innovative use of servo patterns having two polarities.

In an alternate embodiment shown in FIG. 7, each servo line is written using two polarities. In this example, the same polarity is preserved within nested groups of symbols, so that timing calculations are not affected, but the polarity can vary between nested groups. FIG. 6C shows the signal from the pattern shown in FIG. 7, taken from line 7–7', which crosses two nested groups.

Using this strategy gives each nested group the equivalent of one bit of information carried in its polarity. Thus, by combining the bits of information carried by the nested groups, information, such as the current longitudinal location on the tape, can be stored.

In a further alternate embodiment, a combination of the two strategies above is used. A first servo pattern encodes the longitudinal location on the tape using both polarities to write this information, as shown in FIG. 7. A second servo pattern carries the identical longitudinal information as the first pattern, but the polarities are exactly reversed, as shown in FIG. 7. By using the first servo pattern in, for example, the first, second, and fifth servo tracks and the second servo pattern in the third and fourth servo tracks, information regarding the position both laterally and longitudinally on the tape are recorded.

Figure 8A:
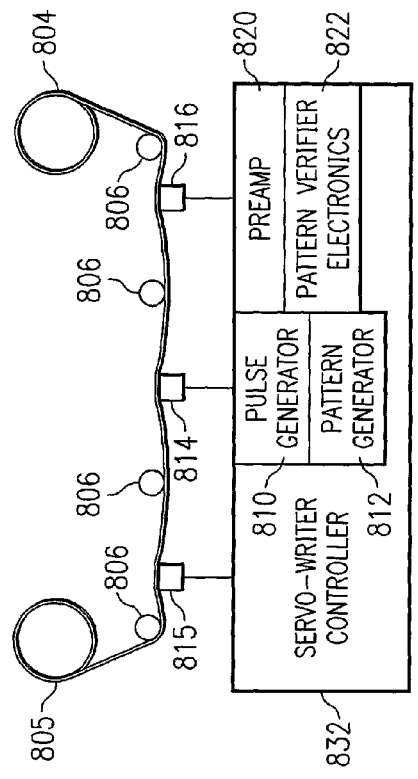
FIG. 8A shows a simplified diagram of a servo writer system that can implement the innovative system of servo tracks.
Figure 9:
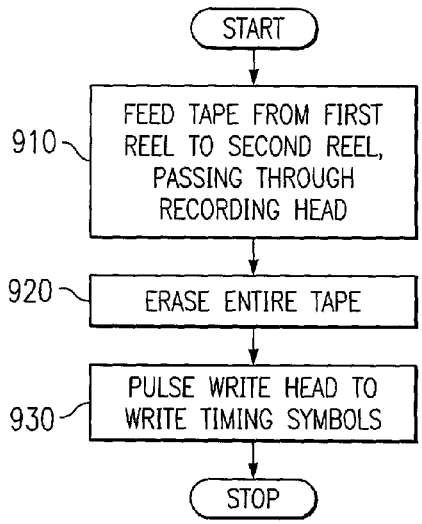
FIG. 9 gives a flow for creating the servo tracks on a tape.

FIG. 8A is a simplified version of a servo writer that can implement the innovative system of servo tracks, while FIG. 9 gives a flow for creating the tape. These figures will now be discussed in terms of the overall flow. The tape runs between reel 805 and reel 804. Tensioners 806 help keep a constant tension on the tape for smoother operation. Erase head 815 continuously erases the tape, followed by write head 814, which is pulsed to write the pattern, and read head 816, which verifies that the pattern was correctly written. Controller 832 controls the movement of the reels 804 and 805, as well as the erase head 815, write head 814 and read head 816. In writing servo tracks to a tape, the tape moves from reel 805 to reel 804 as all servo tracks are written in one pass (step 910). As the tape moves, it is first erased (step 920), then the write head is pulsed repeatedly, each time creating one copy of each servo track's pattern. The writing of this repetitive pattern creates the servo track (step 930). On the hardware side, pattern generator 812 processes the given pattern and controls the pulse generator 810 so that the write head 814 is driven to create the desired pattern. Once the signal is written, it is verified by reading the signal, amplifying the signal in preamp 820 and sending it to the pattern verifier electronics 822. Once the entire tape has been processed, the tape is ready to use for data storage.

Figure 8B:
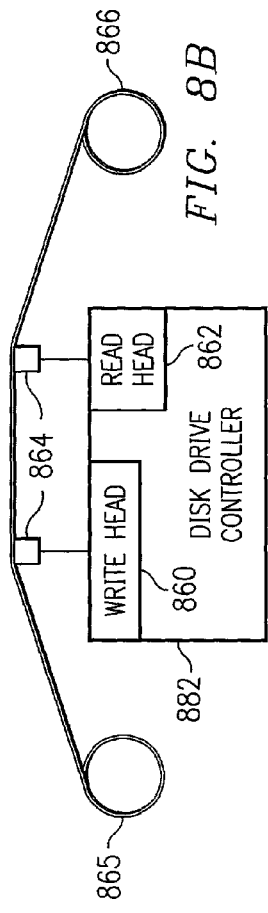
FIG. 8B shows a simplified diagram of a tape drive system that can use the innovative system of servo tracks.
Figure 10:
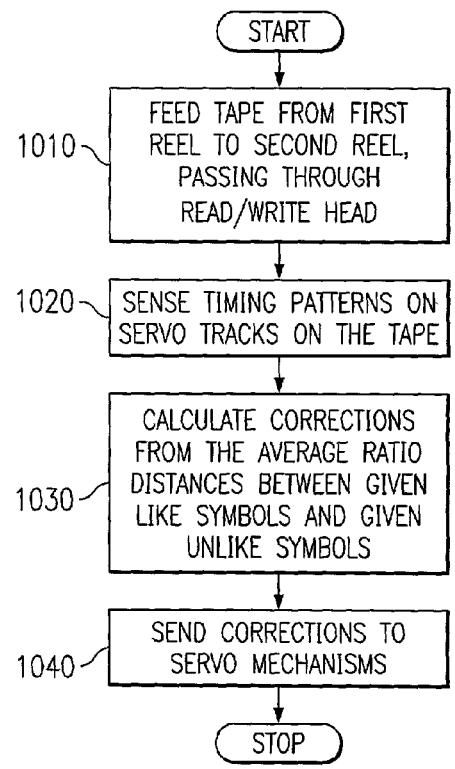
FIG. 10 gives a flow for using the tape.
Figure 11:
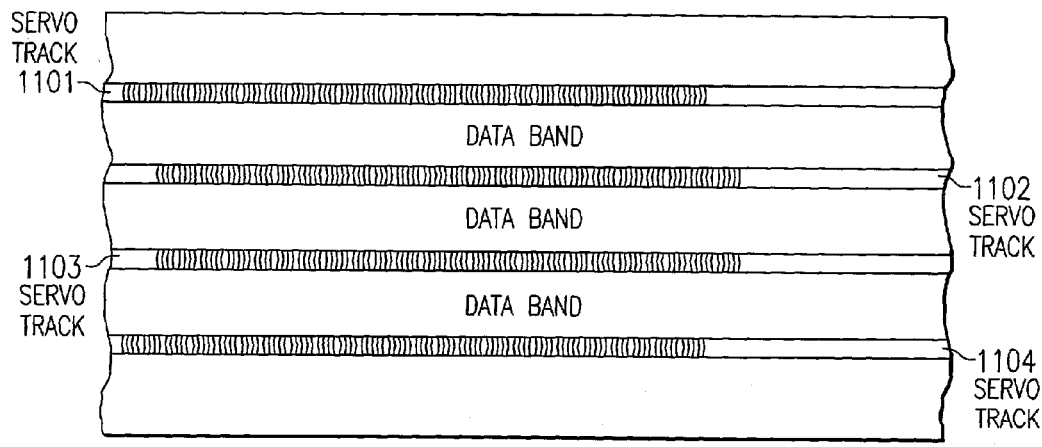
FIG. 11 shows a prior art solution to identifying the servo tracks.

FIG. 8B shows a tape drive and tape that is being used for data storage, while FIG. 10 shows a flow chart for the tracking mechanisms. The tape is connected so that it runs from a first reel 865 to a second reel 866, passing across write head 864 and read head 862 (step 1010). Tape controller 882 controls the movement of reels 865 and 866, as well as the activity of read head 862 and write head 864. The controller 882 also controls the servo mechanisms (not specifically shown) by which the lateral movement of the head with respect to the tape is controlled. Whether the tape is being written to or read from, the servo tracks are read and their patterns sensed (step 1020). The distances between like symbols are measured, as are the distances between mated pairs of unlike symbols; average distances are calculated (step 1030). From the calculations, corrections are figured and sent to the servo mechanisms to act upon (step 1040).

The simple innovation disclosed in this application provides the possibility of greatly increasing the efficiency of information stored in the servo tracks by allowing polarity to carry a separate message from that of the timing pattern.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

For instance, the use of patterned write heads has been disclosed for writing the servo patterns, but other methods can be devised that do not require the write heads to be patterned.

It is further noted that servo tracks can also be referred to as servo bands; the meaning is the same.

What is claimed is:

1. A media on which information can be magnetically recorded, said media comprising:
    a magnetic material;
    a plurality of servo tracks recorded on said magnetic material; and
    a plurality of timing-based servo patterns written on respective ones of said plurality of servo tracks;
    wherein said plurality of timing-based servo patterns contain two opposite polarities;
    wherein each of said plurality of timing-based servo patterns contain a single polarity; and
    wherein said opposite polarities in the plurality of timing-based servo patterns are used to determine which set of data tracks is being read.

2. The media of claim 1, wherein each of said plurality of timing-based servo patterns are identical except for differences in polarity.

3. The media of claim 1, wherein ones of said plurality of timing-based servo patterns contain said two opposite polarities.

4. The media of claim 1, wherein each of said plurality of timing-based servo patterns contain said two opposite polarities.

5. The media of claim 1, wherein each of said plurality of timing-based servo patterns contain said two opposite polarities and a first one of said servo patterns contains information encoded in a pattern of polarities that is an exact opposite of the pattern of polarities in a second servo pattern.

6. A method of recording a plurality of timing-based servo patterns on a magnetic media, comprising the steps of:
    erasing said magnetic media; and
    writing a plurality of polarized symbols to a plurality of servo tracks using two opposite polarities;
    wherein each of said plurality of timing-based servo patterns is written with a single polarity; and
    wherein said opposite polarities are used to determine which set of data tracks is being read.

7. The method of claim 6, wherein identical timing-based servo patterns are written to each of said plurality of servo tracks except that polarities differ between ones of said plurality of servo tracks.

8. The method of claim 6, wherein ones of said plurality of timing-based servo patterns are written with both of said two opposite polarities.

9. The method of claim 6, wherein each of said plurality of timing-based servo patterns are written with both of said two opposite polarities.

10. The method of claim 6, wherein each of said plurality of timing-based servo patterns are written with both of said two opposite polarities and a first one of said servo patterns is written with information encoded in a pattern of polarities that is an exact opposite of the pattern of polarities written in a second servo pattern.

11. The method of claim 6, wherein said plurality of servo tracks are written simultaneously.

12. A method of recording servo patterns on a magnetic tape, comprising the steps of:
    running a tape from a first reel, over a read/write head, and onto a second reel;
    erasing said tape; and
    writing a plurality of patterns on said tape with a given polarity to form first and second servo tracks, wherein said plurality of patterns comprise a first set of symbols having a first azimuthal inclination and a second set of symbols having a second azimuthal inclination that is different from said first azimuthal inclination;
    wherein ones of said plurality of symbols are magnetized with a first polarity and ones of said plurality of symbols are magnetized with a second polarity that is opposite said first polarity;
    wherein said first servo track is magnetized with a first polarity and said second servo track is magnetized with a second polarity; and
    wherein said first and second polarities in said first and second servo tracks are used to determine which set of data tracks is being read.

13. The method of claim 12, wherein said first servo track and said second servo track are each magnetized with both said first and said second polarity.

14. The method of claim 12, wherein said first servo track and said second servo track are each magnetized with both said first and said second polarity and a first one of said servo patterns is written with information encoded in a pattern of polarities that is an exact opposite of the pattern of polarities written in a second servo pattern.

15. A method of operating a tape drive, comprising the steps of:
    running a tape from a first reel, over a read/write head, and onto a second reel;
    sensing a plurality of first symbols that are azimuthally inclined in a first direction and a plurality of second symbols that are azimuthally inclined in a second direction, wherein said plurality of symbols are carried in a plurality of servo tracks on said tape;
    using ratios of distances between occurrences of said first and said second symbols to calculate corrections in the movement of a read/write head;
    wherein ones of said plurality of first and second symbols are written in a first polarity and ones of said plurality of first and second symbols are written in an opposite polarity;
    wherein ones of said plurality of servo tracks are each magnetized with one of said first and said second polarity; and
    wherein said first and second polarities in said plurality of servo tracks are used to determine which set of data tracks is being read.

16. The method of claim 15, wherein ones of said plurality of servo tracks are each magnetized with both said first and said second polarity.

17. The method of claim 15, wherein each of said plurality of timing-based servo patterns contain said two opposite polarities and a first one of said servo patterns contains information encoded in a pattern of polarities that is an exact opposite of the pattern of polarities in a second servo pattern.

* * * * *